United States Patent [19]

Reimers

[11] 3,762,934
[45] Oct. 2, 1973

[54] REPETITIVE HEAT TREATMENT AT SPEEDS HIGHER THAN FEEDING

[76] Inventor: James L. Reimers, San Jose, Calif.

[22] Filed: Dec. 8, 1970

[21] Appl. No.: 96,195

Related U.S. Application Data

[62] Division of Ser. No. 787,647, Dec. 30, 1968, Pat. No. 3,613,551.

[52] U.S. Cl. ................................. 99/182, 99/214
[51] Int. Cl. ......................... A23l 3/02, B65b 55/02
[58] Field of Search ................... 99/182, 214, 184, 99/185, 360, 364, 365, 370, 363, 366; 165/65, 120; 62/63, 381

[56] References Cited
UNITED STATES PATENTS

| | | | |
|---|---|---|---|
| 1,391,953 | 9/1921 | Hansen | 99/214 |
| 1,570,235 | 1/1926 | Fooks | 99/214 X |
| 2,517,542 | 8/1950 | Clifcorn et al. | 99/214 |
| 2,536,116 | 1/1951 | Wilbur | 99/214 X |
| 2,607,698 | 8/1952 | Martin | 99/214 |
| 3,181,692 | 5/1965 | Mencacci | 99/214 X |
| 3,495,523 | 2/1970 | Mencacci | 99/214 X |

Primary Examiner—Norman Yudkoff
Assistant Examiner—Kenneth P. Van Wyck
Attorney—F. W. Anderson et al.

[57] ABSTRACT

Food processing method for cooking rows of filled containers within a cylindrical pressure housing and for supporting the containers in elongated carriers of an endless processing conveyor. The conveyor is trained around a multiplicity of drive sprockets near the upper portion of the housing and is draped therefrom and guided along a plurality of looped paths below the drive sprockets as well as along an arcuate path above the sprockets to more fully utilize the holding capacity of the housing. The plurality of drive sprockets are arranged to cause a plurality of direction changes and to permit the conveyor to be driven at high speeds during processing thereby agitating the contents of the containers to affect more efficient heat transfer. Additional agitation may be imparted to the containers by permitting them to project downwardly from the carriers against curved retaining plates during a portion of their travel through the cooker. The cooker also includes an improved feed and discharge mechanism for feeding rows of containers into and discharging rows of containers from the housing of the pressure cooker through one end thereof.

5 Claims, 13 Drawing Figures

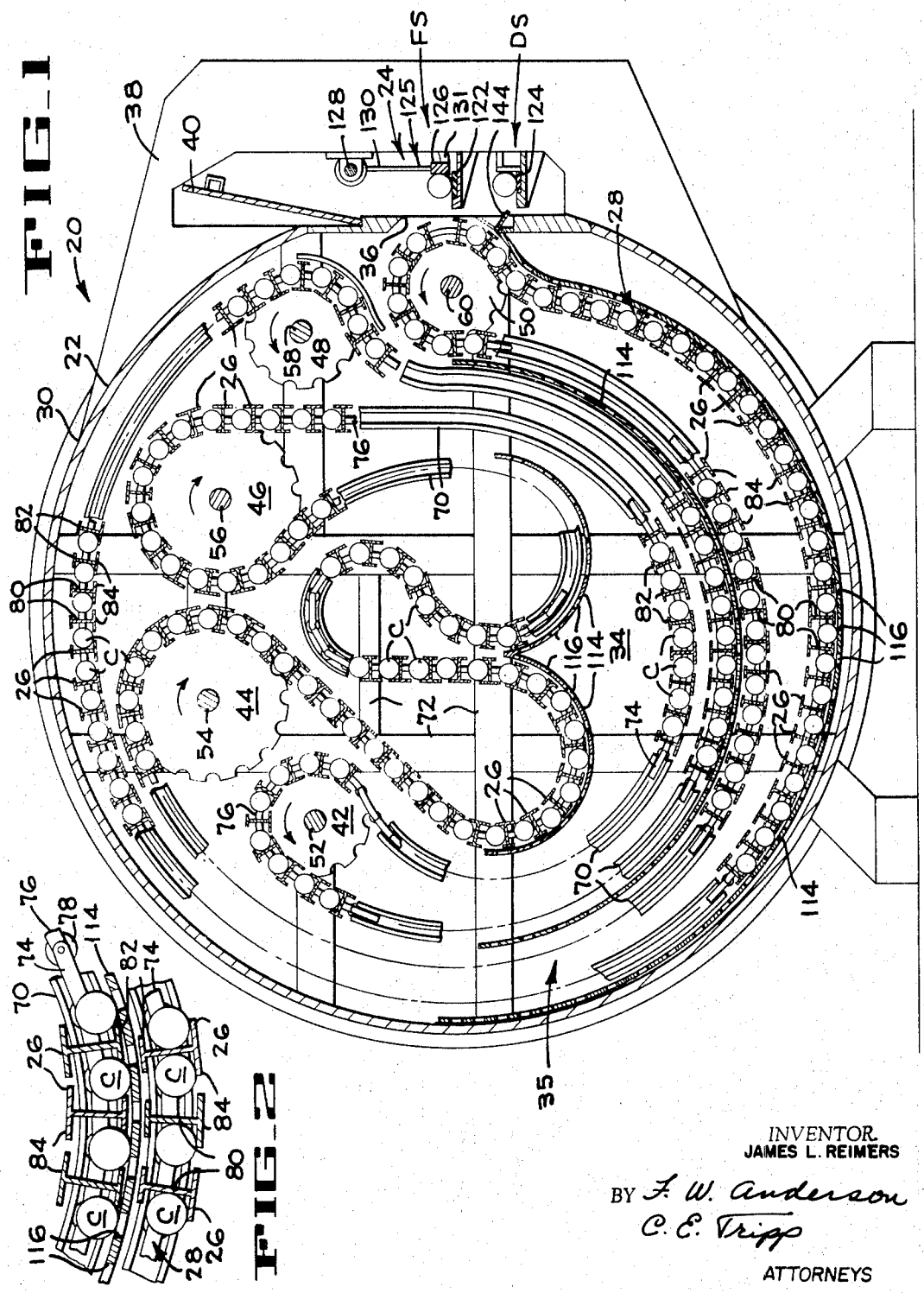

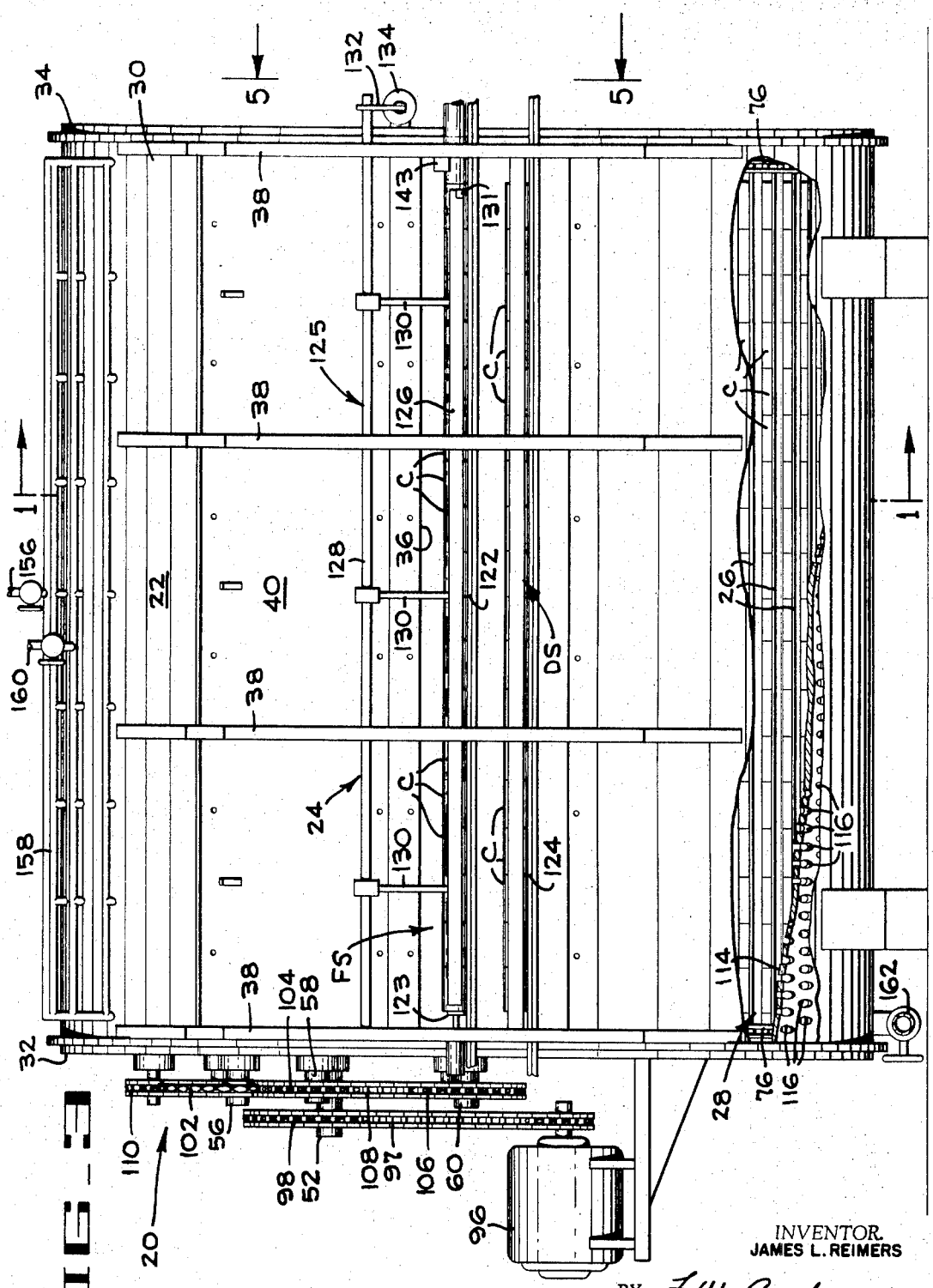

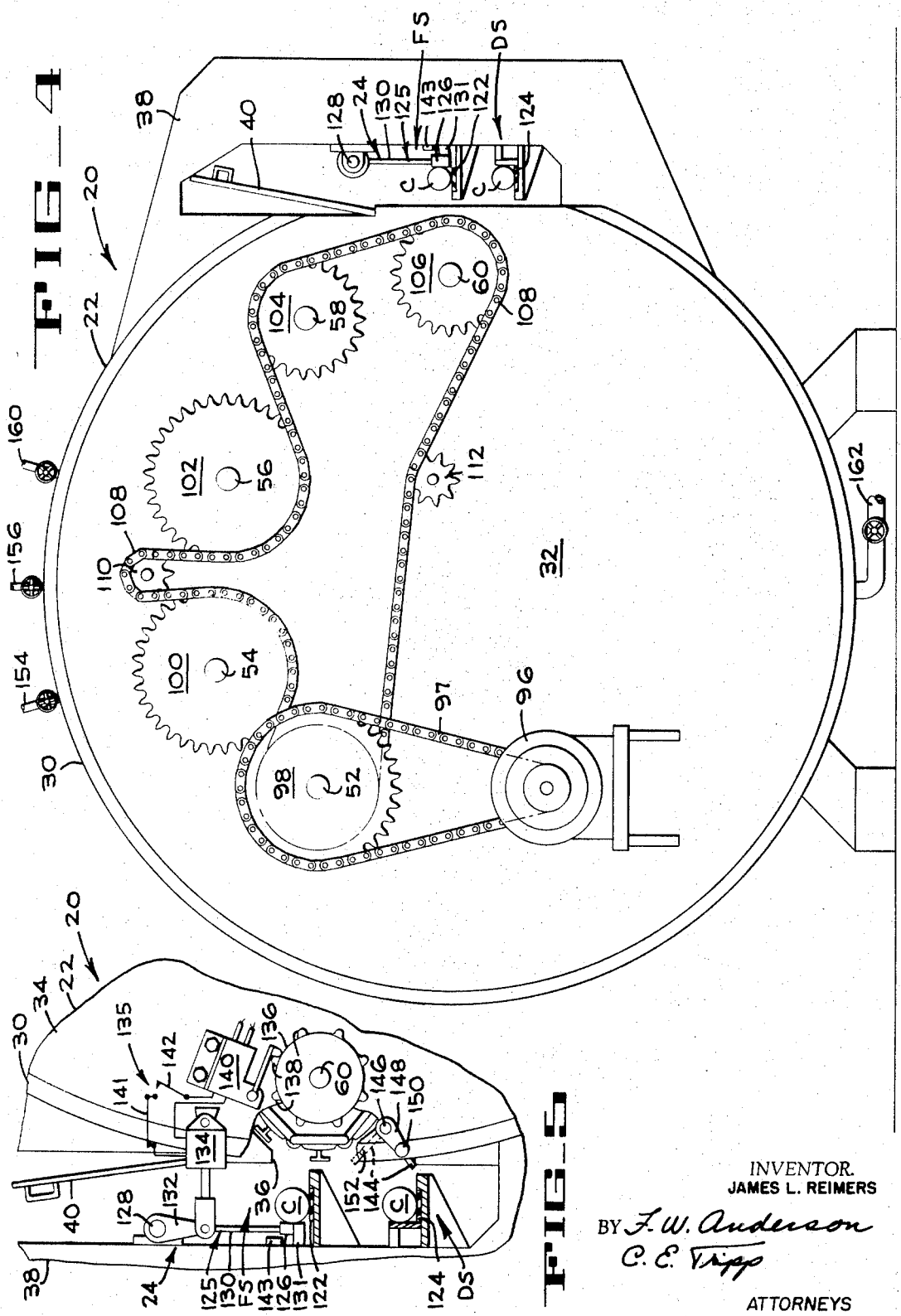

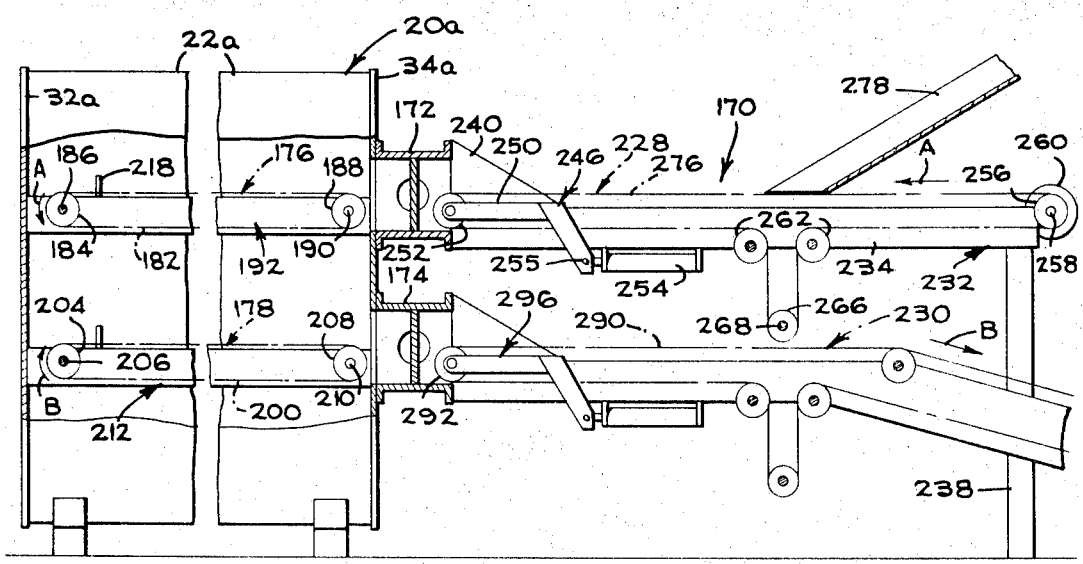
FIG_6
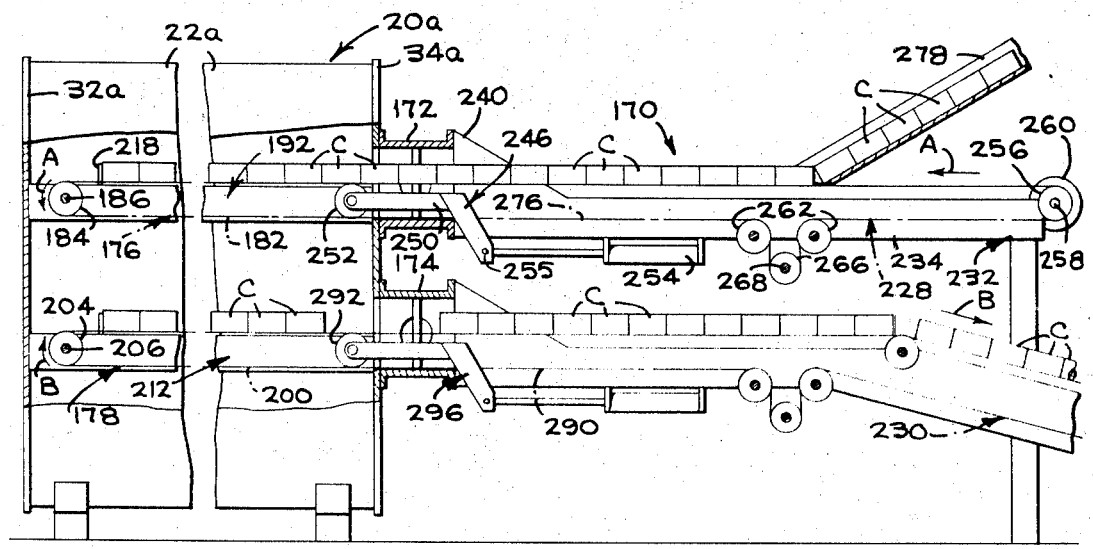
FIG_7

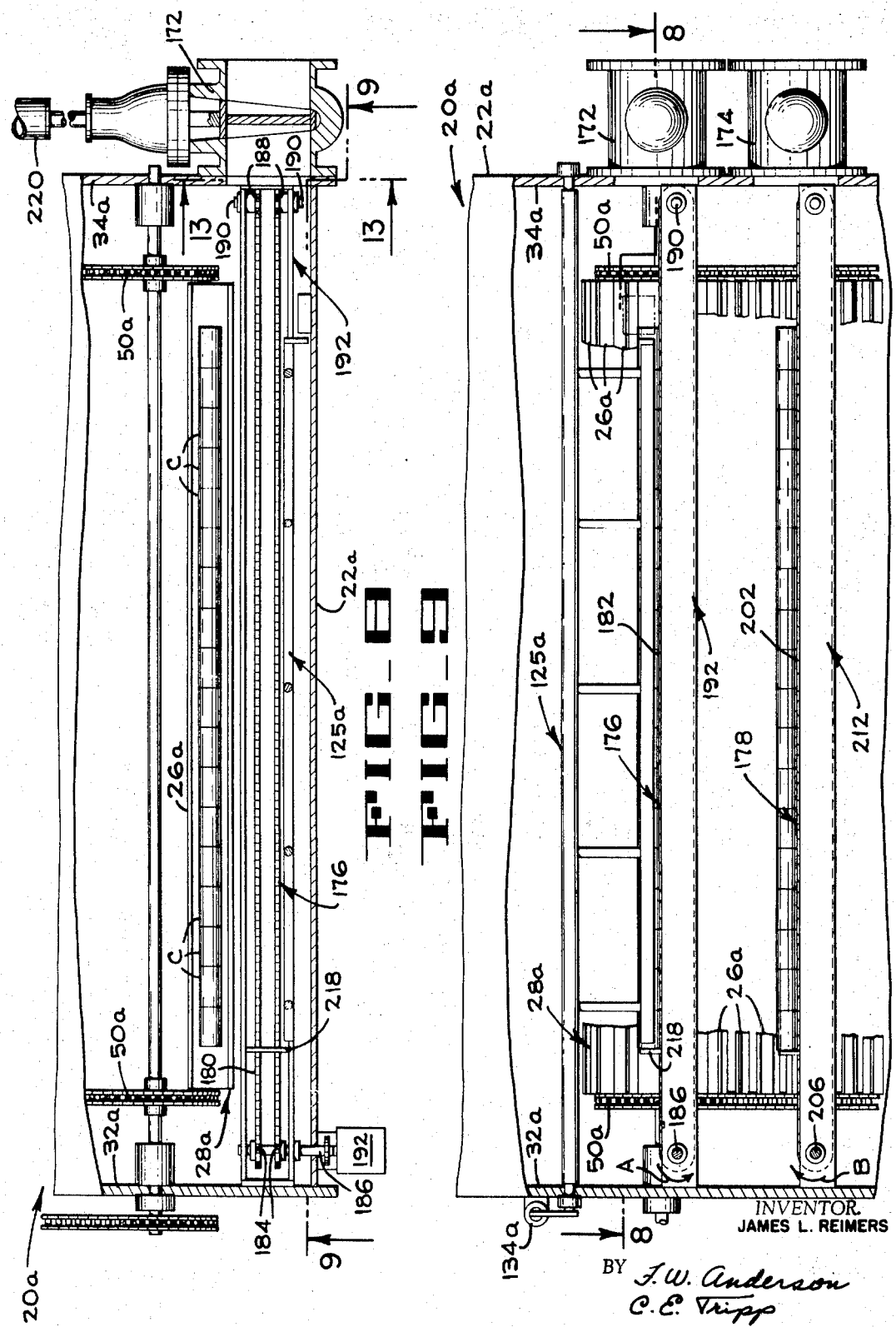

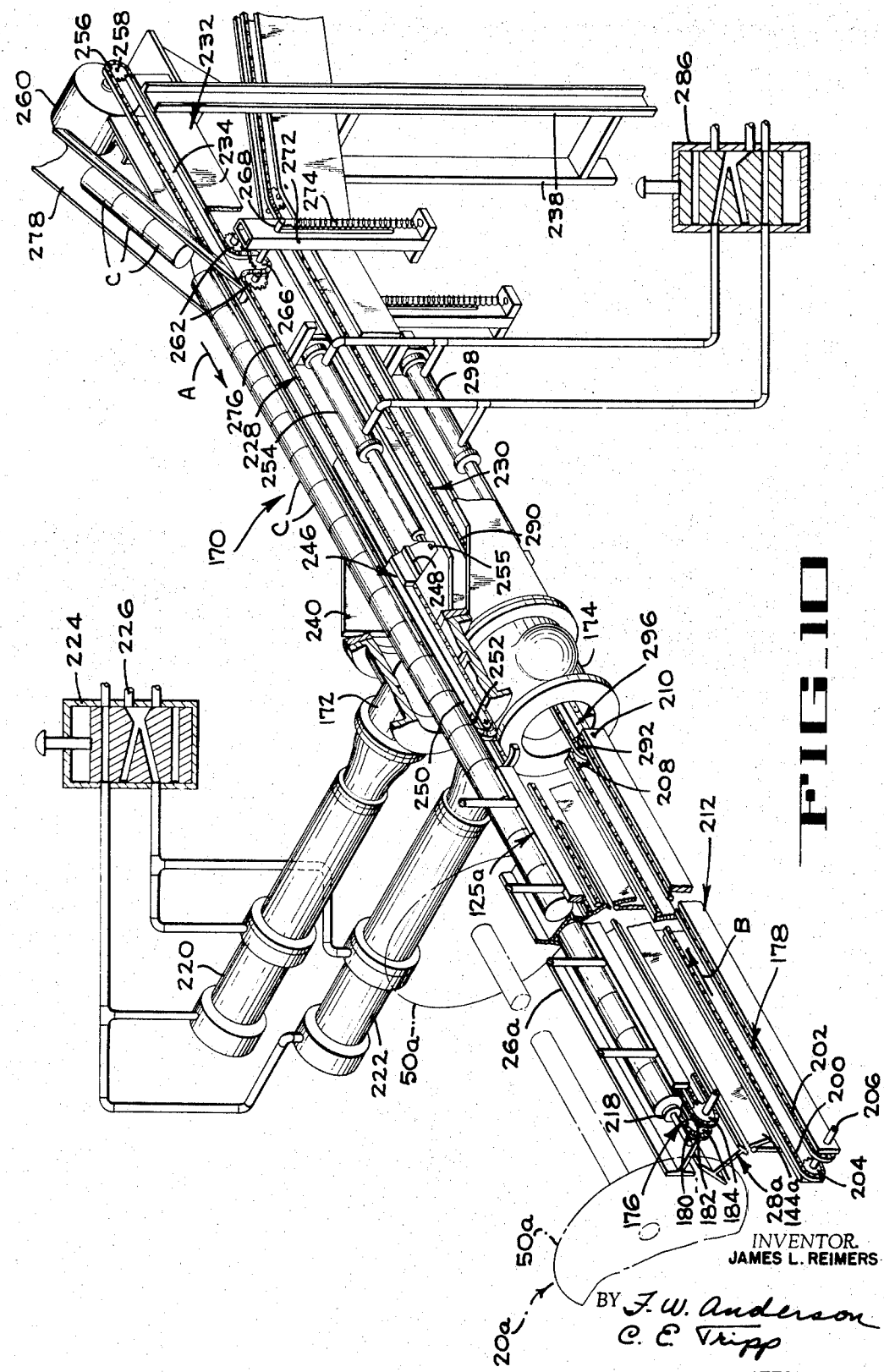

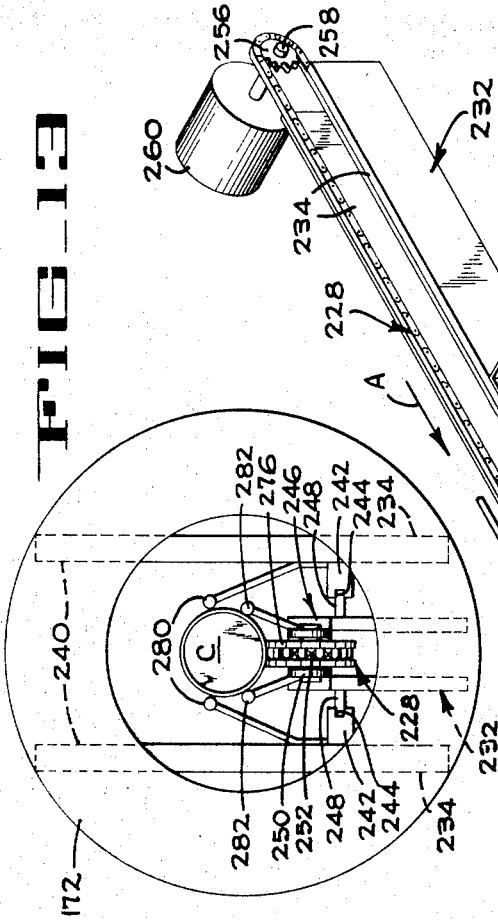
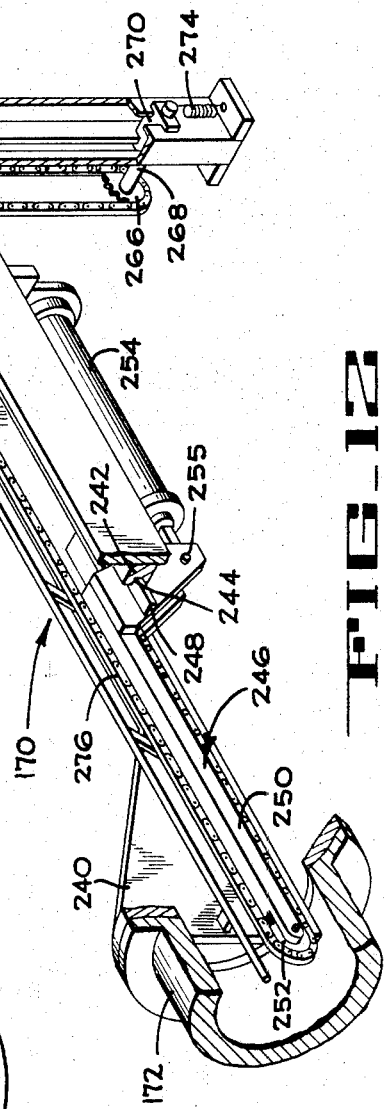
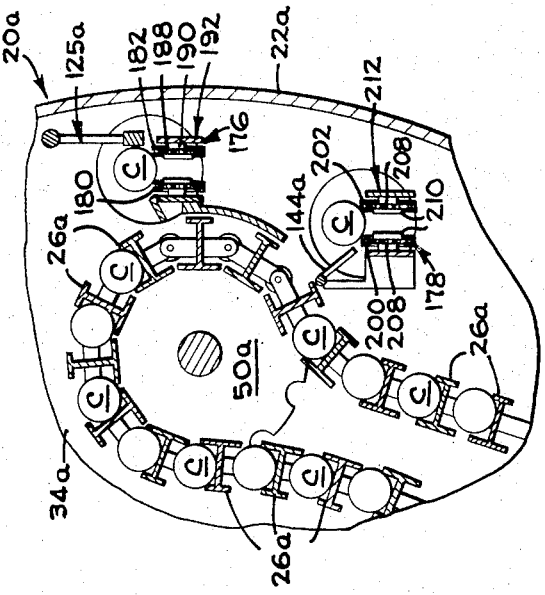

ns and abruptly changed thus imparting a high degree of agitation to the contents of the containers. A second embodiment of the apparatus also discloses an improved feed and discharge system adapted to move the containers into one end of the housing rather than through a slot in the cylindrical wall thereof thus eliminating the necessity of providing substantial reinforcement for the cylindrical wall to withstand high cooking pressures within the apparatus during processing.

REPETITIVE HEAT TREATMENT AT SPEEDS HIGHER THAN FEEDING

CROSS-REFERENCE TO RELATED APPLICATION

This is a division of Reimers Ser. No. 787,647, filed Dec. 30, 1968, now U.S. Pat. No. 3,613,551, entitled "Heat Treatment Apparatus."

The heat treatment method of the present invention employs an apparatus somewhat similar to the apparatus disclosed in my copending application Ser. No. 660,281, which application was filed on Aug. 14, 1967 and issued on May 5, 1970 as U.S. Pat. No. 3,510,310.

BACKGROUND OF THE INVENTION

1. Field of the Invention

This invention pertains to the cooker art and more particularly relates to an agitating cooker and an improved feed and discharge mechanism adapted to handle rows of containers within a cylindrical pressure housing.

2. Description of Prior Art

Several types of heat treatment apparatus have been used for cooking and cooling food products hermetically sealed in containers such as cans or glass jars. One such apparatus is the well known hydrostatic cooker which may be of the type disclosed in U.S. Pat. No. 3,286,619 which issued to Lee on Nov. 22, 1966. These cookers include conveyors which advance rows of containers through water legs which may be of the order of 60 feet tall, and accordingly, these cookers are quite expensive. Also, the product being cooked in hydrostatic cookers are subjected to very little agitation.

Another type of cooker is the reel and spiral type such as that disclosed in U.S. Pat. No. 2,536,116 which issued to Paul C. Wilbur on Jan. 2, 1951. This type of cooker has the disadvantage of requiring that the containers be fed to and discharged from the cooker one at a time, and also has the disadvantage of requiring that the containers be advanced spirally through the cooker from one end to the other thus subjecting the containers to considerable frictional wear. The holding capacity of these cookers is also quite limited since the containers are retained in a single layer near the periphery of the cooker housing. Container agitation in this type of cooker is also quite limited.

Another type of cooker heretofore used quite extensively by small canners is the batch type retort cooker. In this type of cooker very little control is exercised over the containers being processed, and accordingly, many dents occur if cans are being processed, and excessive breakage occurs if the containers are glass jars. When containers are being processed by retort cookers, the containers receive little if any agitation.

SUMMARY OF THE INVENTION

The heat treatment method of the present invention employs an apparatus similar to that disclosed in my aforementioned copending application and is specifically arranged to subject the containers to a high mount of agitation. The apparatus includes a cylindrical housing having a cylindrical wall and closed ends and having elongated row accommodating carriers mounted on an endless processing conveyor. The conveyor is trained around a plurality of drive sprockets within the housing in a manner which more completely utilizes the holding capacity within the housing and which drivingly supports the conveyor at several locations so that the conveyor may be rapidly driven, and so that the direction of movement of the containers will be frequently and

BRIEF DESCRIPTION OF THE DRAWINGS

FIG. 1 is a diagrammatic vertical central section taken along lines 1—1 of FIG. 3 through a first embodiment of the heat treatment apparatus of the present invention.

FIG. 2 is an enlarged elevation of a fragment of two rows of the processing conveyor illustrating several carriers of the processing conveyor and the tracks for guiding the same.

FIG. 3 is a diagrammatic side elevation of the apparatus of FIG. 1.

FIG. 4 is a diagrammatic end elevation of the apparatus illustrating the drive mechansim for the processing conveyor.

FIG. 5 is an enlarged fragmentary elevation looking in the direction of arrows 5—5 of FIG. 3 illustrating the control system for the feed mechanism.

FIG. 6 is a diagrammatic side elevation of a second embodiment of the invention illustrating a heat treatment apparatus associated with an end feed and discharge mechanism, the end feed and discharge mechanism being shown in an inactive position.

FIG. 7 is a diagrammatic side elevation similar to FIG. 6 but showing the end feed and discharge mechanism in an active feed and discharge position.

FIG. 8 is an enlarged plan of a portion of the heat treatment apparatus of FIG. 6, the feed station being illustrated in section taken along lines 8—8 of FIG. 9, only one carrier of the processing conveyor being shown.

FIG. 9 is a section taken substantially along lines 9—9 of FIG. 8.

FIG. 10 is a diagrammatic perspective of the end feed and discharge mechanism shown in the active position with certain parts being cut away and other parts being shown in section or in phantom.

FIG. 11 is an enlarged vertical transverse section taken through the feed and discharge station of the appparatus of FIG. 6.

FIG. 12 is a diagrammatic perspective of the infeed conveyor, certain parts being removed and other parts being shown in section.

FIG. 13 is a section taken substantially along lines 13—13 of FIG. 8 illustrating the guide rails associated with the infeed conveyor.

DESCRIPTION OF PREFERRED EMBODIMENT

A first embodiment of the heat treatment apparatus 20 (FIGS. 1-5) of the present invention discloses a batch process wherein the containers are fed into and discharged from the apparatus from one side thereof. The apparatus includes a cylindrical housing 22 having a feed and discharge mechanism 24 at a feed station FS and discharge station DS for deflecting rows of containers C to be processed transversely into elongated carriers 26 of a looped processing conveyor 28 and for receiving processed containers from the carriers 26. During the transverse or side feeding and discharging operation the conveyor is driven at the relatively slow rate of about 20 rows per minute which corresponds to a conveyor speed of about 5 feet per minute. After the containers C have been loaded into the carriers 26, the housing 22 is sealed in pressure tight relationship and a heat treatment medium at high temperature and pressure is first directed into the housing to cook the product, and thereafter high pressure air and cooling water is directed into the housing to cool the contents of the containers. During the cooking and cooling operation the conveyor 28 is driven at a high rate of speed, for example, at about 300 feet per minute, thereby agitating the contents of the containers to improve the rate of heat transfer. After the containers have been cooked and cooled, the housing is opened and the conveyor 28 is again driven at its slow rate to discharge about 20 rows of processed containers per minute from the carriers of the processing conveyor, and to simultaneously receive other rows of containers to be processed.

More particularly, the apparatus 20 comprises the housing 22 which includes a cylindrical shell 30 with its ends sealed in pressure tight engagement by end walls 32 and 34 to define a processing chamber 35. An elongated slot 36 is formed in the cylindrical shell to allow the rows of containers to be moved transversely therethrough during the feeding and discharging operations. A plurality of reinforcing ribs 38 are secured to the shell adjacent the slot 36 to reinforce the area adjacent the slot to prevent deflection thereof when subjected to high cooking pressures. The housing is closed during the cooking and cooling operation by a removable gate 40 which is bolted in pressure tight engagement over the slot 36.

As best shown in FIG. 1, the processing conveyor 28 is supported by and trained around five pair of driven sprockets 42, 44, 46, 48 and 50 which sprockets are keyed to drive shafts 52, 54, 56, 58 and 60, respectively, journaled in and sealed to the end walls 32 and 34. In addition to the above referred to pairs of sprockets, the conveyor 28 is accurately guided along its tortuous path within the housing by channel tracks 70 which are secured to frames 72 within the housing 22 adjacent each end wall 32 and 34. All of the sprockets are disposed within the upper portion of said chamber and the pathway of the conveyor and carriers loops downwardly into the lower portion of the chamber between each sprocket over which the pathway passes. Between sprockets 44 and 46 the chains also twist around the centermost portion of the chamber in addition to looping downwardly.

As is well known in the art, the carriers 26 (FIG. 2) of the processing conveyor 28 are of the articulating I-beam type and are mounted between and connected to opposed links 74 of two spaced parallel chains 76, which chains are trained around the pairs of sprockets and include rollers 78 that are guided along the tracks 70. Each carrier includes an elongated web 80 having a narrow flange 82 on one edge and a wide flange 84 on the other edge. The sprockets 50 (FIG. 1) adjacent the slot 36 in the housing are small in diameter causing adjacent carriers to deflect a sufficient amount to open the carriers permitting rows of containers to be processed to be deflected into the carriers and permitting processed containers to gravitate therefrom.

The processing conveyor 28 is driven by a variable speed motor-transmission unit 96 (FIG. 4) which is connected by a chain drive 97 to the shaft 52. Shafts 52, 54, 56, 58 and 60 have drive sprockets 98, 100, 102, 104 and 106, respectively, keyed thereon. A drive chain 108 is trained around the sprocket 98, 100, 102, 104 and 106, and around idler sprockets 110 and 112. Thus, the conveyor 28 (FIG. 1) is driven by the five pairs of sprockets 42, 44, 46, 48 and 50 thereby distributing the driving load to spaced points on the conveyor 28. In this regard, the arrangement of the pairs of drive sprockets 42, 44, 46, 48 and 50 is such that each of the pairs of drive sprockets either pushes or pulls approximately 20 percent of the total length of the processing conveyor, which conveyor length is about 120 feet when the conveyor is fitted within a housing that is about 10 feet in diameter. It will further be noted that all of the pairs of driven sprockets, except for the sprockets 48, (FIG. 1) are pulling the conveyor 28 when the conveyor is moving upwardly and are pushing the conveyor when the conveyor is moving downwardly. Although sprockets 48 are pushing a short section of the processing conveyor upwardly against the forces of gravity, it will be noted that a much larger portion of that run of the conveyor gravitationally pulls the conveyor downwardly thereby keeping the conveyor taut. This minimizes friction forces which the several pairs of sprockets must overcome.

Since the pairs of drive sprockets are arranged so as to engage and drive the processing conveyor 28 at substantially evenly spaced intervals, the conveyor can be rapidly driven during processing, for example, at the rate of about 300 feet per minute. This rapid speed subjects the containers to a high degree of agitation since the containers are alternately subjected to clockwise and counterclockwise rotation as indicated by the arrows in FIG. 1.

In order to increase the amount of agitation to which the rows of containers are subjected while being processed, curved guide plates 114 are mounted below those runs of the conveyor having the narrow flanges 82 lowermost. The guide plates 114 are provided with a plurality of spaced elongated slots 116 that extend parallel to the direction of movement of the conveyor and permit cooling liquid to flow therethrough. It is, of course, understood that the agitation of the food product within the containers increases the rate of heat transfer through the product during both the cooking and the cooling operations.

As best shown in FIG. 5, the feed and discharge mechanism 24 is disposed immediately adjacent the elongated slot 36 in the shell 30 and is operated only after the gate 40 has first been removed from the slot and is placed in the inactive position shown in FIG. 5. The feed and discharge mechanism 24 comprises a continuously driven feed conveyor 122 which advances rows of containers C to be processed against a stop 123 (FIG. 3) into position to be deflected transversely of the length of the rows through the elongated slot 36 and into the carriers 26, and a continuously driven discharge conveyor 124 for gravitationally receiving rows of processed containers which move transversely from the carriers through the slot 36.

In order to deflect rows of containers into the carries 26, a feed transfer device 125 of the mechanism 24 is provided and includes a transfer bar 126 that is connected to a shaft 128 by arms 130. An arcuate plate 131 secured to one end of the bar 126 precludes entry of containers into the feed station FS when the bar is in its active container deflecting position. The shaft 128 is pivotally mounted on the reinforcing ribs 38 and has an arm 132 keyed thereto which is pivotally connected to the movable element of a power unit 134, such as a solenoid, that is anchored to the housing 22. The solenoid is included in a control circuit 135 and is energized upon detection of a full row of containers in loading position at the feed station and upon detection of a carrier being in position to receive a row of containers. In this regard, a cam 136 is keyed to the shaft 60 and has a plurality of lobes 138 on its periphery which close the contacts of a switch 140 to energize the solenoid 134 through the closed contacts of a manually operated switch 141 each time a carrier 26 is in position to receive a row of containers C and through closed contacts of a full row switch 142 which closes only when a full row of containers are at the feed station FS. Energization of the solenoid causes the transfer bar 126 to sweep across the feed conveyor 122 and push the row of containers into carriers in a manner well known in the art. It will be understood that the manual switch 141 is opened during the cooking and cooling operation thereby rendering the solenoid inactive.

The full row switch 142 is closed only when a sensing head 143 detects the presence of stationary containers adjacent thereto thus indicating that a full row of containers has been formed on the feed conveyor 122 in position to be deflected into the associated carrier 26. The sensing head 143 may be a Peco Model G, Can-Flo Control as manufactured by Peco Corporation, 111 Artega Avenue, Mountain View, California.

In order to permit gravitational discharge of the rows of containers from the carriers 26 after they have been cooked and cooled, an elongated bridge plate 144 (FIGS. 1 and 5) is pivoted from the dotted line position to the full line position as illustrated in FIG. 5. The bridge plate 144 is mounted on a pivot shaft 146 journaled in the end walls of the housing 22 and has an actuating arm 148 keyed thereto. The arm 148 is provided with a spring loaded locking pin 150 which is selectively positioned in either of two holes 152 (only one being shown) in the end wall 34 to selectively lock the bridge plate 144 in either the dotted or the full line positions (FIG. 5).

As diagrammatically illustrated in FIGS. 3 and 4, steam or a steam-air mixture is introduced into the housing 22 through a valved conduit 154, cooling water is introduced into the housing through a valved conduit 156 connected to a spray system 158 (FIG. 3) and high pressure air is directed into the housing through a valved conduit 160 during at lesat the initial portion of the cooling cycle to prevent injury to the containers which might occur if the pressure acting on the external surfaces of the containers was suddenly reduced to atmospheric pressure. A valved drain conduit 162 is provided in the lower portion of the housing 22 to drain cooling water and condensate therefrom.

In the operation of the first embodiment of the heat treatment apparatus 20 of the present invention it will be assumed that the product being processed is dog food hermetically sealed in 300 × 407 cans, i.e., cans that are 3 inches in diameter and 4 7/16 inches in length. The gate 40 is removed from the elongated slot 36 (FIG. 1) and the motor-transmission unit 96 is energized to drive the processing conveyor 28 at the rate of about 20 rows per minute. The bridge plate 144 is pivoted to its downwardly inclined position illustrated in solid lines in FIG. 5 so that a previously processed batch of containers in the apparatus 20 will gravitate transversely therefrom one row at a time and be removed from the apparatus 20 by the continuously driven discharge conveyor 124.

The manual switch 141 of the feed and discharge mechanism 24 is closed and a batch of the containers to be processed are advanced by the continuously driven feed conveyor 122 into position to be deflected transversely, in rows of about 18 containers each, into the housing 22 and into the associated carriers 26. Each time the movement of the containers on the feed conveyor 122 is stopped by the container stop 123 (FIG. 3), the sensing head 143 closes switch 142 (FIG. 5). Each time the switch 142 is closed and a carrier 26 is in position to receive a row of containers, one of the cam lobes 138 (FIG. 5) of cam 136 closes the switch 140 thereby energizing solenoid 134 causing a row of containers to be swept transversely from the feed conveyor 122 through the slot 36 and into the particular carrier 26 that is in the feed position. After substantially all of the carriers of the processing conveyor 28 have been filled, the manual switch 141 is opened thereby deactivating the solenoid 134 of the feed and discharge mechanism 24. The bridge plate 144 is locked in its upwardly inclined position (FIG. 1) to retain the containers in the carriers 26 as the carriers move past the slot 36, and the gate 40 is then bolted in fluid tight relationship over the elongated slot 36.

The motor-transmission unit 96 is then actuated to drive the conveyor at the rate of about 300 feet per minute. The cooking medium, which is preferably steam at about 250° F and 15.1 psig., is then directed into the housing 22 through valved conduit 154 and is maintained at this temperature and pressure for about 60 minutes. During this time the containers are subjected to a considerable amount of agitation since they are alternately and abruptly swung counterclockwise and clockwise as indicated by the arrows in FIG. 1 around the plurality of relatively sharp curves defined by the several sets of sprockets and guide tracks within the housing 22. The containers of dog food are additionally agitated since they project out of the carriers 26 and roll along the aforementioned guide plates 114.

After the containers have been subjected to the cooking medium for about 60 minutes, high pressure air at about 15.1 psig. is directed into the housing 22 through conduit 160, and cooling water at about 75° F is sprayed into the housing from the conduit 156 and spray system 158 to cool the contents of the containers. After the contents have been cooled sufficiently to reduce the pressure within the containers to a safe level, the valved air supply conduit 160 is closed. It will be understood that the conveyor is driven at the high speed of about 300 containers per minute during both the cooking and cooling operations, and that the cooling operation, when processing dog food, is completed within about 35 minutes. During this cooling operation water is drained from the housing 22 through valved conduit 162.

After the cooling operation has been completed, the motor-transmission unit 96 is de-energized, gate 40 is removed from the elongated slot 36, and the bridge plate 144 is locked in its downwardly inclined position. The motor-transmission unit 96 is then re-energized and adjusted to drive the processing conveyor 28 at its slow speed of about 20 rows per minute. During this interval, the rows of processed containers are discharged from the processing conveyor 28 onto the discharge conveyor 124, and simultaneously therewith, rows of containers to be processed are fed into the carriers 26 to again load the carriers with containers to be processed.

Although the above operation is directed to the processing of dog food hermetically sealed within cans, it will be understood that other food products such as milk, vegetables, fish, and fruit may be processed by the heat treatment apparatus 20. It will also be understood that other types of containers may be used such as glass jars, fiber containers, and flexible containers or pouches. It will also be understood that other heat treatment mediums may be used. For example, when processing products in glass jars it may be desirable to use hot water subjected to an overriding air pressure when cooking, and cold water subjected to an overriding air pressure when cooling.

The second embodiment of the invention as illustrated in FIGS. 6 to 13 provides a heat treatment apparatus 20a which is substantially the same as the apparatus 20 except that the containers are fed into the cylindrical housing 22a from one end thereof rather than through an elongated slot in the side as was done in the first embodiment of the invention.

Since the heat treatment appartus 20a of the second embodiment of the invention includes a processing conveyor 28a (FIGS. 8, 9 and 11), a drive system for the processing conveyor, a transfer device 125a and a control circuit therefor, and a conduit system for introducing heat treatment mediums into the apparatus 20a that are substantially the same as those disclosed in the apparatus 20, the description of such structure will not be repeated. Parts of the heat treatment apparatus 20a that are similar to the parts of the apparatus 20 will be assigned the same numerals followed by the letter "a."

As indicated above, the primary distinction between the two embodiments of the present invention is that the apparatus 20 (FIG. 1) has rows of containers C fed into and discharged transversely from the apparatus through the slot 36 in the housing 22, whereas the apparatus 20a is provided with an end feed and discharge mechanism 170 (FIGS. 6, 7, 10 and 12) which feeds and discharges rows of containers C through gate valves 172 and 174, respectively, secured to the end plate 34a of the housing 22a. It will be understood that the housing 22a is slightly larger in diameter than the housing 22 (FIG. 1) so as to accommodate an endless feed conveyor 176 (FIGS. 6–9 and 11) and a discharge conveyor 178 of the mechanism 170 within the housing 22a immediately adjacent the carriers 26a of the feed conveyor 28a as they move around the feed sprockets 50a as best illustrated in FIG. 11.

The feed conveyor 176 comprises a pair of spaced endless chains 180 and 182 which are trained around drive sprockets 184 (FIG. 8) keyed to a shaft 186, and around a pair of driven sprockets 188 each of which is keyed on a stub shaft 190. The shaft 186 is journaled in an elongated frame 192 secured to the end walls 32a and 34a, while each stub shaft 190 is journaled to the adjacent portion of the frame 192 so that a space occurs between the sprockets 188. The drive shaft 186 projects through a stuffing box in the housing wall 22a and is continuously driven in the direction of the arrows A by a motor 192 during the feeding and discharging operation. Guide rails (not shown) are secured to the frame 192 to maintain the upper run of the feed conveyor 176 horizontal.

Simialrly, the discharge conveyor 178 comprises a pair of endless chains 200 and 202 which are trained around spaced drive sprockets 204 keyed to a shaft 206, and around a pair of spaced driven sprockets 208 each of which is keyed to a stub shaft 210. The shaft 206 is journaled in an elongated frame 212 secured to the end walls 32a and 34a, while each stub shaft 210 is journaled in an adjacent portion of the frame 212 so that a space exists between the sprockets 208. The drive shaft 206 projects through a stuffing box in the housing wall 22a and is continuously driven in the direction indicated by the arrow B by a motor (not shown) during the feeding and discharging operation. Guide rails (not shown) are secured to the frame 212 and maintain the upper run of the discharge conveyor 178 horizontal.

After a complete row of containers have been moved by the feed conveyor 176 in position to be deflected into the adjacent carrier 26a of the conveyor 28a with the foremost container resting against a stop 218, the transfer device 125a is actuated in timed relation with the movement of the conveyor by a power unit 134a (FIG. 9) of a control circuit which is identical to control circuit 135 (FIG. 5) to deflect the row of containers into the particular carrier 26a at the feed station.

During the feed and discharge operation the gate valves 172 and 174 (FIGS. 6–10) are opened by pneumatic cylinders 220 and 222 (FIG. 3) upon actuation of a manual valve 224 connected to a high pressure source of air by conduit 226.

In order to positively transfer rows of containers through the feed valve 172 and onto the feed conveyor 176, and to positively transfer rows of processed containers from the discharge conveyor 178 and through the discharge gate valve 174, the end feed and discharge mechanism 170 includes an input conveyor 228 (FIGS. 6, 7, 10 and 12) and an output conveyor 230 (FIGS. 6, 7 and 10).

The input conveyor 228 (FIGS. 6, 7, 10, 12 and 13) is mounted on a frame 232 that includes spaced longitudinally extending beams 234 supported at one end by legs 238 and at the other end by webs 240 that are secured to the feed valve 172. A pair of slide bars 242 (FIGS. 12 and 13) having elongated parallel slots 244 therein are secured to the beams 234. A carriage 246 includes a pair of plates 248 which are slidably received in the slots 244, and also includes an elongated horizontal arm 250 which has its free end slotted so as to rotatably receive a small diameter idler sprocket 252. A pneumatic cylinder 254 has one end anchored to the frame 232 and the other end connected to the carriage 246 by a pin 255. A drive sprocket 256 (FIG. 12) is keyed to a shaft 258 journaled in the frame 232 and coupled to a motor 260. Two spaced idler sprockets 262 are journaled on shafts secured to the spaced beams 234 near their midpoint, and a movable take-up sprocket 266 is journaled on a shaft 268 that is carried by a slide block 270. The slide block 270 is slidably received within a slotted vertical tube 272 and is urged downwardly to the position shown in FIG. 12 by a spring 274. An endless chain 276 is trained around the sprockets 252, 256, 262 and 266 and its upper run is supported in a horizontal plane by a guide rail (not shown). The upper run of the chain 276 is continuously driven in the direction indicated by arrows A by the motor 260 during the feed and discharge operation. Containers to be processed are directed onto the conveyor 228 by a gravity chute 278 (FIG. 10) and are retained on the single chain 276 by guide rails 280 (FIG. 13) secured to the beams 234 and disposed on both sides of the chain 276. In addition to the rails 280, short movable guide rails 282 are positioned on opposite sides of the chain 276 and are mounted on the carriage arm 250.

When it is desired to feed containers through the gate valve 172 and into the housing 22a (FIGS. 6 and 7), the gate valve 172 is opened by actuation of the pneumatic valve 224 (FIG. 10) and a manual pneumatic valve 286 is actuated to direct high pressure air into the left end of the pneumatic cylinder 254 to move the free end of the carriage 246 through the gate valve 172 as indicated in FIGS. 7 and 10 so that the sprocket 252 is disposed between the spaced sprockets 188 (FIG. 8) of a feed conveyor 176. Thus, the input conveyor 228 and feed conveyor 176 cooperate to move containers into the feed station in position to be deflected into the carriers 26a of the conveyor 28a. It will be noted that when the input conveyor 228 is in its extended position shown in FIGS. 7 and 10, that the take-up sprocket 166 is moved upwardly against the urging of spring 274, and that the guide rails 282 (FIG. 13) are positioned so as to guide the containers through the gate valve 172 and onto the two spaced chains 180 and 182 of the feed conveyor 176.

The output conveyor 230 (FIGS. 6, 7 and 10) is quite similar to the input conveyor 228 and, accordingly, will not be described in detail. It will suffice to say that the output conveyor 230 includes an endless chain 290 trained around an idler sprocket 292 journaled on the free end of an elongated arm of a carrige 296. The chain 290 is also trained around idler sprockets and take-up sprockets similar to those of the input conveyor 228, and is driven in the direction indicated by the arrows B in FIGS. 6, 7 and 10 by a motor (not shown).

During the feed and discharge operation the discharge gate valve 174 is opened in response to activation of the manual valve 224 which energizes pneumatic cylinder 222. The carriage sprocket 292 is then moved through the open gate valve 174 into position between the sprockets 208 (FIG. 10) of the discharge conveyor 178 in response to actuation of the pneumatic valve 286 which energizes a pneumatic cylinder 298 that is connected between the carriage 296 and frame 232. Thus, rows of containers discharged from the carriers 26a of the processing conveyor 28a over the bridge plate 144a and onto the discharge conveyor 178 will be advanced by the discharge conveyor 178 and the output conveyor 230 out of the housing 22a and through the open discharge valve 174 to other container handling equipment not shown.

From the foregoing description it will be apparent that the batch type heat treatment apparatus of the present invention includes an endless processing conveyor disposed within a cylindrical pressure housing and guided along a tortuous path, which path is specifically arranged to impart a high degree of agitation to the rows of containers when driven at high speeds. The processing conveyor is driven at high speeds during processing, and at a slow speed during the feed and discharge operation by a plurality of spaced pairs of sprockets within the cylindrical housing. The sprockets are arranged to alternately and abruptly change the direction of movement of the containers thereby agitating the contents of the containers.

In accordance with the first embodiment of the invention the rows of containers are moved transversely through a slot in the cylindrical wall of the heat treatment apparatus when rows of containers are fed into or discharged from the housing. In accordance with the second embodiment of the invention, an end feed and discharge system is provided for reliably moving containers into and discharging containers from one end of the housing of the heat treatment apparatus.

Although the best mode contemplated for carrying out the present invention has been herein shown and described, the subject matter which is regarded as the invention is set forth in the appended claims.

What is claimed is:

1. A method of processing products in sealed containers comprising the steps of introducing rows of containers to be processed from a feed station into a processing zone, confining the containers within said zone, subjecting the confined containers first to a heating medium and thereafter to a cooling medium maintained at a superatmospheric pressure, agitating the contents of the containers when subjected to said heating medium and cooling medium by moving the confined rows of containers transversely at a high rate of speed along an endless tortuous path which includes a plurality of arcuately curved portions of small radii leading into sections of larger curvatures to alternately and abruptly swing the containers clockwise and counterclockwise at high speeds, repeatedly moving the containers through said endless path and past the feed station during application of said heating and cooling mediums, terminating the application of said heating and cooling mediums upon the containers, reducing the speed of the rows of containers to a slow container transfer speed for slowly advancing the containers transversely along said tortuous path until all rows of treated containers are released from said path at a common discharge point, and thereafter removing the containers from said zone.

2. A method according to claim 1 wherein said high speed is about 300 feet per minute and said slow speed is about 5 feet per minute.

3. A method according to claim 1 wherein said rows of containers are introduced into and are discharged from said zone when moving transversely of the longitudinal axes of said containers.

4. A method according to claim 1 wherein said rows of containers are introduced into and are discharged from said zone when moving parallel to the longitudinal axes of said row of containers.

5. A method of processing products in sealed containers comprising the steps of introducing rows of containers to be processed from a feed station into a processing zone, confining the containers within said zone, subjecting the confined containers first to a heating medium and thereafter to a cooling medium maintained at superatmospheric pressure, agitating the contents of the containers with subjected to said heating medium and cooling medium by moving the confined rows of containers transversely at a high rate of speed along an endless tortuous path hich includes a plurality of arcuately curved portions of small radii arranged to alternately and abruptly swing the containers clockwise and counterclockwise at high speeds thereby subjecting the containers to substantially and rapidly varying angular accelerations within the processing zone, repeatedly moving the containers through said endless path and past said feed station during application of said heating and cooling mediums, reducing the speed of the rows of containers to a slow container transfer speed for slowly advancing the containers transversely along said tortuous path until all rows of treated containers are released from said path at a common discharge point, and thereafter releasing the containers from confinement within the processing zone and removing the containers from said zone.

* * * * *

UNITED STATES PATENT OFFICE
CERTIFICATE OF CORRECTION

PATENT NO. : 3,762,934
DATED : October 2, 1973
INVENTOR(S) : JAMES L. REIMERS

It is certified that error appears in the above-identified patent and that said Letters Patent are hereby corrected as shown below:

On 1st page the "Assignee" was not put in: It should be:
-- Assignee: FMC Corporation, San Jose, Calif.--.

Column 1, line 29: change "of" to -- on --.
Column 4, line 64: change "carries" to -- carriers --.
Column 5, line 53: change "lesat" to -- least --.
Column 8, line  5: change "simialrly" to -- Similarly --.
Column 9, line 26: change "166" to -- 266 --.
Column 9, line 37: change "carrice" to -- carriage --.
Column 10, line 55: change "row" to -- rows --;
Column 10, line 63: change "with" to -- when --;
Column 10, line 66: change "hich" to -- which --.

Signed and sealed this 3rd day of June 1975.

(SEAL)
Attest:

RUTH C. MASON
Attesting Officer

C. MARSHALL DANN
Commissioner of Patents
and Trademarks